US010845192B2

(12) United States Patent
Lause

(10) Patent No.: US 10,845,192 B2
(45) Date of Patent: Nov. 24, 2020

(54) MACHINE TOOL TEST FIXTURE

(71) Applicant: Shawn Thomas Lause, Leslie, MO (US)

(72) Inventor: Shawn Thomas Lause, Leslie, MO (US)

( * ) Notice: Subject to any disclaimer, the term of this patent is extended or adjusted under 35 U.S.C. 154(b) by 236 days.

(21) Appl. No.: 16/130,604

(22) Filed: Sep. 13, 2018

(65) Prior Publication Data
US 2019/0078879 A1    Mar. 14, 2019

Related U.S. Application Data

(60) Provisional application No. 62/558,134, filed on Sep. 13, 2017.

(51) Int. Cl.
| | |
|---|---|
| *G01B 21/04* | (2006.01) |
| *B23Q 17/22* | (2006.01) |
| *B23Q 17/00* | (2006.01) |

(52) U.S. Cl.
CPC ........... *G01B 21/042* (2013.01); *B23Q 17/22* (2013.01); *B23Q 17/00* (2013.01)

(58) Field of Classification Search
CPC ........ G01B 3/30; G01B 21/04; G01B 21/042; G01B 21/047; G01B 5/004; G01B 5/016; G01B 5/02; G01B 5/025; G01B 5/08; B23Q 17/22
See application file for complete search history.

(56) References Cited

U.S. PATENT DOCUMENTS

| | | | | |
|---|---|---|---|---|
| 3,425,134 | A | * 2/1969 | Christensen | B21D 28/04 33/628 |
| 4,364,182 | A | * 12/1982 | Jones | G01B 21/042 33/567 |
| 4,932,136 | A | * 6/1990 | Schmitz | G01B 3/30 33/502 |
| 4,962,591 | A | * 10/1990 | Zeller | G01B 3/30 33/502 |
| 5,125,261 | A | * 6/1992 | Powley | G01B 21/042 33/502 |
| 5,193,286 | A | * 3/1993 | Collier | G01B 5/0002 33/1 M |
| 5,313,410 | A | * 5/1994 | Watts | G01B 21/042 33/503 |
| 5,813,128 | A | 9/1998 | Bailey | |

(Continued)

OTHER PUBLICATIONS

CMM International, Renishaw to Focus on Metrology and 3D Printing at Southern Manufacturing 2015, internet, available at http://www.cmmmagazine.com/metrology/renishaw-to-focus-on-metrology-and-3d-printing-at-southern-m/, Jan. 8, 2015 (Year: 2015).*

*Primary Examiner* — Michael McCullough

(57) ABSTRACT

The invention relates to a mechanical test fixture used in a machine tool to inspect its positioning, squareness, parallelism, and circularity. The fixture body has two mountable heads that provide machine areas for inspection. The fixture body has one tooling hole that locates the assembly in a CNC machine and in a CMM. The tooling hole serves as one datum point or origin for setup. The flatness of the fixture body and the witnessed face provide repeatable setup results. The fixture body has two feet on its outer legs for fastening to any CNC machine and CMM table. The test fixture qualifies a machine tool by providing a machinable square head and a machinable round head fixed on a fixture body.

19 Claims, 5 Drawing Sheets

(56) References Cited

U.S. PATENT DOCUMENTS

| | | | | |
|---|---|---|---|---|
| 6,833,163 B1* | 12/2004 | Krenkel | C04B 35/573 | 427/380 |
| 7,197,836 B2* | 4/2007 | Kikuti | G01B 21/042 | 33/1 CC |
| 7,557,936 B2* | 7/2009 | Dickinson | G01B 11/005 | 356/620 |
| 7,640,674 B2* | 1/2010 | Ferrari | G01B 21/042 | 33/502 |
| 7,765,079 B2* | 7/2010 | Nara | G01B 21/042 | 702/94 |
| 7,777,898 B2* | 8/2010 | Matsumura | B23Q 17/22 | 356/614 |
| 7,869,026 B2* | 1/2011 | Boyer | G01B 21/042 | 356/243.1 |
| 7,908,756 B2* | 3/2011 | Clifford | G01B 21/042 | 33/502 |
| 8,516,709 B2* | 8/2013 | Dreier | G01B 21/042 | 33/502 |
| 8,949,071 B2* | 2/2015 | Takanashi | G01B 5/201 | 33/502 |
| 9,151,588 B2* | 10/2015 | Sakurada | G01B 5/08 | |
| 9,639,083 B2* | 5/2017 | Tseo | G05B 19/41875 | |
| 9,829,300 B2* | 11/2017 | Somerville | G01B 5/008 | |
| 9,952,044 B2* | 4/2018 | Gatton | G01B 3/30 | |
| 10,166,644 B2* | 1/2019 | Kume | B23Q 17/20 | |
| 10,189,133 B2* | 1/2019 | Hwang | G05B 19/404 | |
| 10,222,207 B2* | 3/2019 | Polidor | G01B 11/007 | |
| 10,323,921 B2* | 6/2019 | Nakayama | G01B 5/201 | |
| 10,585,419 B1* | 3/2020 | Benedict | G01B 5/008 | |
| 2001/0008994 A1* | 7/2001 | Omori | G01B 21/20 | 702/95 |
| 2001/0045021 A1* | 11/2001 | Matsuda | G01B 21/042 | 33/502 |
| 2002/0157449 A1* | 10/2002 | Asanuma | G01B 21/042 | 73/1.79 |
| 2004/0083830 A1* | 5/2004 | Nashiki | B25J 17/0266 | 73/865.9 |
| 2004/0136706 A1* | 7/2004 | Takahashi | G03B 19/12 | 396/281 |
| 2005/0235506 A1* | 10/2005 | Brost | G01B 5/20 | 33/502 |
| 2010/0101104 A1* | 4/2010 | Grzesiak | G01B 21/042 | 33/502 |
| 2014/0007441 A1* | 1/2014 | Pettersson | G01B 21/045 | 33/503 |
| 2016/0054722 A1* | 2/2016 | Jalluri | G05B 19/401 | 700/195 |
| 2016/0161239 A1* | 6/2016 | Takanashi | G01B 5/0014 | 33/551 |
| 2019/0025793 A1* | 1/2019 | Ould | B23Q 17/22 | |
| 2019/0154433 A1* | 5/2019 | Matsumura | G01B 11/02 | |

* cited by examiner

| | TARGET DIMENSION | ACTUAL |
|---|---|---|
| R20 | 6.0000 | 5.9998 |
| R21 | 6.0000 | 5.9998 |
| R22 | 6.0000 | 6.0001 |
| R23 | 6.0000 | 6.0001 |

| | TARGET DIMENSION | ACTUAL |
|---|---|---|
| R24 | 6.0000 | 5.9998 |
| R25 | 6.0000 | 6.0001 |
| R26 | 6.0000 | 6.0002 |
| R27 | 6.0000 | 6.0002 |
| R28 | 6.0000 | 5.9998 |
| R29 | 6.0000 | 5.9999 |
| R30 | 6.0000 | 6.0001 |
| R31 | 6.0000 | 6.0001 |

MACHINE TOOL TEST FIXTURE

CROSS-REFERENCE TO RELATED APPLICATION

This non-provisional application claims priority to pending provisional application No. 62/558,134 filed on Sep. 13, 2017 which is owned by the same inventor.

FIELD OF THE INVENTION

The present invention relates to a precision machined fixture. More particularly, the mechanical fixture provides a standard gage for qualifying machining centers.

BACKGROUND OF THE INVENTION

Computerized numerical control, or CNC, machines provide accurate positioning for milling and drilling operations but over time do not position within their designed tolerances due to wear, age, or micro debris.

CNC machines position to within 0.0002 inch, two ten-thousandths of an inch. In the die/mold industry, many work pieces have mating features which require this high tolerance positioning. Mating features machine within such tolerance to accept their designed fit precisely. CNC machine tool operators meet these requirements when they know they control an accurate machine.

Machine tools undergo individual testing to their original equipment manufacturer, or OEM, specifications by means of mechanical positioning tests using a telescoping magnetic bar. But, this adequate test does not provide real world results. Often, this test is not necessarily performed by the designated machine operator who performs the accurate programming adjustments on a daily basis. Furthermore, no mechanical evidence accumulates to show qualification of the machine.

Work pieces, produced in manufacturing facilities, often require a quality room for an inspection after their machining operations. A Coordinate Measuring Machine, or CMM, allows an operator to inspect work pieces against their designed tolerances. This process focuses primarily on measuring of the finished work piece and often overlooks the quality of the machine tool that performs the work.

DESCRIPTION OF THE PRIOR ART

The U.S. Pat. No. 5,813,128 to Bailey shows an adequate calibration test using a ball bar and that requires processes used outside of daily manufacturing practices. The ball bar shown in this patent has a ball upon each end for placement in two ball and socket joints. This calibration tool though does not represent and does not produce mechanically tangible results.

SUMMARY OF THE INVENTION

The invention serves as a standard fixture in a CNC machine and a CMM to verify the quality of a CNC machine tool and a CMM. The fixture has the same plane, origin, and orientation duplicated accurately during setup in a CNC or a CMM. The tooling hole located in the center of the fixture allows for repeating the origin. The bottom of the legs machined flat and parallel with the top surface of the body, defines a plane identical in both the CNC and the CMM. A witnessed edge of the body provides a surface to set the straightness orientation in both the CNC and the CMM. The fixture accepts test heads for mounting on the top of the body by precise fastening at a nominal distance set from the tooling hole.

Numerous objects, features and advantages of the present invention will readily appear to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a machine tool test fixture used to qualify machine tools where the fixture assembly upon setup in a CNC machine provides test cuts and additional setup in a CMM provides the test cut measurements.

Another object of the present invention is to provide a machine tool test fixture that has a testing device to inspect a machine tool's squareness, parallelism, positioning, and circularity combined in one setup.

Another object of the present invention is to provide a machine tool test fixture with a fixed square shape and round shape test heads that both mount on one body to inspect a machine tool.

Another object of the present invention is to provide a machine tool test fixture that has a design of a flat fixture with one origin to use as a datum point.

Another object of the present invention is to provide a machine tool test fixture that allows for precise setup by a designated machine tool operator.

Another object of the present invention is to provide a machine tool test fixture that lessens machine downtime through ease of setup while increasing a machine's daily throughput.

Another object of the present invention is to provide a machine tool test fixture that informs operators about the designated machine's quality and provides direction when making daily adjustments to achieve specified tolerances on work pieces.

Another object of the present invention is to provide a machine tool test fixture that simultaneously uses a square test head and a round test head on one fixture leading to accurate machine results.

Another object of the present invention is to provide a machine tool test fixture that follows a standard way to record machine tool results and manage a machine tool's work schedule based upon the results.

Another object of the present invention is to provide a machine tool test fixture that minimizes poor results in machine tool alignment with non-critical machine work and that maximizes results in machine tool alignment with critical machine work Another object of the present invention is to provide a machine tool test fixture that brings attention to the needs of maintenance of a machine tool.

Another object of the present invention is to provide a machine tool test fixture that identifies problem areas with a machine before problems appear in production.

Another object of the present invention is to provide a machine tool test fixture that having mountable test heads spaced away from each other.

Another object of the present invention is to provide a machine tool test fixture that has spacing between test heads for access by machine tool operators to measure their own test cuts using their micrometers.

Another object of the present invention is to provide a machine tool test fixture that allows a machine tool operator to identify the machine's integrity prior to a CMM inspection.

Another object of the present invention is to provide a machine tool test fixture that has two apertures located on the top of the fixture body for lifting.

Another object of the present invention is to provide a machine tool test fixture that, after making test cuts in a CNC machine tool, allows an operator to install the fixture with test heads in a CMM.

Another object of the present invention is to provide a machine tool test fixture that has threaded apertures positioned with clearance around the test heads from lifting chains and straps.

Another object of the present invention is to provide a machine tool test fixture that prevents operator bumping during inspection of the machine leading to precise results of the CNC machine tool.

Another object of the present invention is to provide a machine tool test fixture that, after machining the test heads, permits an operator to inspect a mill test fixture with the machined heads on the CMM, to record the results, and to provide electronic history for that particular machine tool.

Another object of the present invention is to provide a machine tool test fixture that allows an operator to use hand measuring tools while inspecting machined heads for faster results and later while repairing a machine axis.

Another object of the present invention is to provide a machine tool test fixture that efficiently identifies a machine tool's capabilities for use by any machine tool operator.

Another object of the present invention is to provide a machine tool test fixture that identifies the value of a machine tool based on the machine tool's results.

Another object is to provide such a machine tool test fixture that is capable of manufacturer and distribution at a price suitable for the end customers, supply houses, retailers, and catalogs to provide.

There has thus been outlined, rather broadly, the more important features of the invention in order that the detailed description thereof that follows may be better understood and that the present contribution to the art may be better appreciated. Additional features of the invention will be described hereinafter and which will form the subject matter of the claims attached.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF DRAWINGS

In referring to the drawings.

The same reference numerals refer to the same parts throughout the various figures.

DETAILED DESCRIPTION OF THE INVENTION

The foregoing features, object, and advantages of the invention will become apparent to those skilled in the art from the following detailed description of the preferred embodiment, especially when considered in conjunction with the accompanying drawings. The present invention a Machine Tool Test Fixture provides a standard device for inspecting a machine tool's positioning, squareness, parallelism, and circularity.

Figure 1:
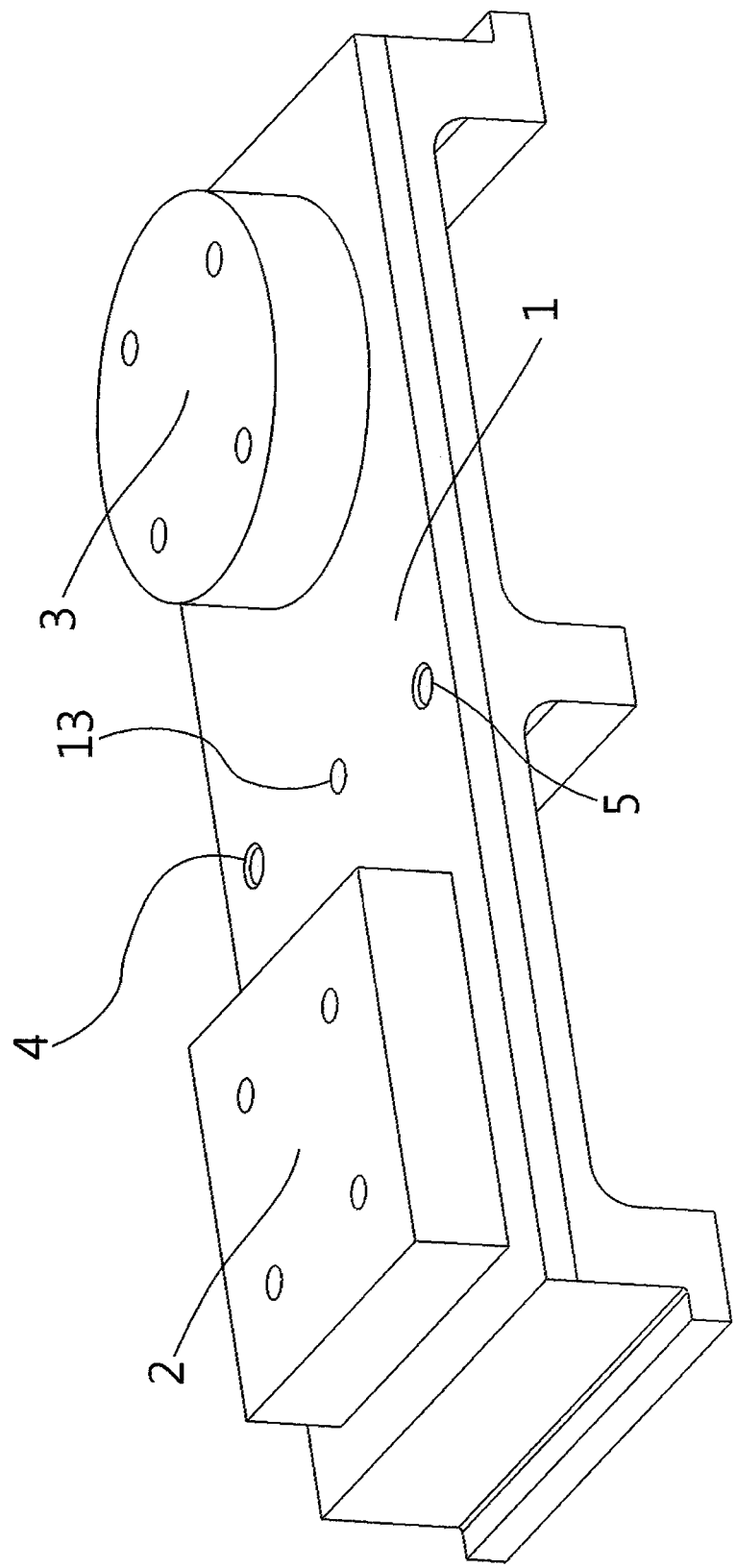
FIG. 1 is a perspective view of the test fixture.

FIG. 1 shows the assembly of the present invention. The fixture body 1 is shown with a left test head 2 and a right head 3 mounted flat upon the body. The fixture body 1 has a tooling hole 13 installed in the center of the body. The fixture body has the left test head 2 and the right test head 3 positioned a nominal distance from the centerline of the tooling hole 13. The test heads have spacing from each other for room for an operator to use hand measuring tools, such as micrometers, when machining the heads on a CNC machine tool, not shown. The machine tool operator can identify the machine's integrity prior to the CMM inspection. The test heads 2, 3 exceed the height of the plane of the tooling hole 13. This height clearance allows the test heads to be qualified while maintaining a repeatable origin. Two spaced apart apertures 4, 5 have right hand threading the receives an eye bolt, not shown, or other mechanical hook, for lifting the entire test fixture 1 on a CNC machine table or on a CMM table. The lifting apertures have a generally centered position upon the body of the text fixture thus permitting even, controlled lifting of the over 60 pound invention. For the most accurate results the test heads are measured at room temperature, sixty-eight degrees Fahrenheit.

The test fixture features both square and round geometric shapes for testing on its left head 2 and right head 3 respectively. Wear, age, and micro debris may cause CNC machines to position out of tolerance. Correcting this positional failure within the machine's parameters can fix the positioning of machining one geometric shape but not another. When adjusting the machine parameters, using a square test head and a round test head on the invention provides accurate machine results. The square test head and a round test head of the invention provide a user, or operator, a dual testing capability. The left head 2 and the right head 3 have tangent surfaces that are equally spaced from the center of the fixture body 1.

Figure 2:
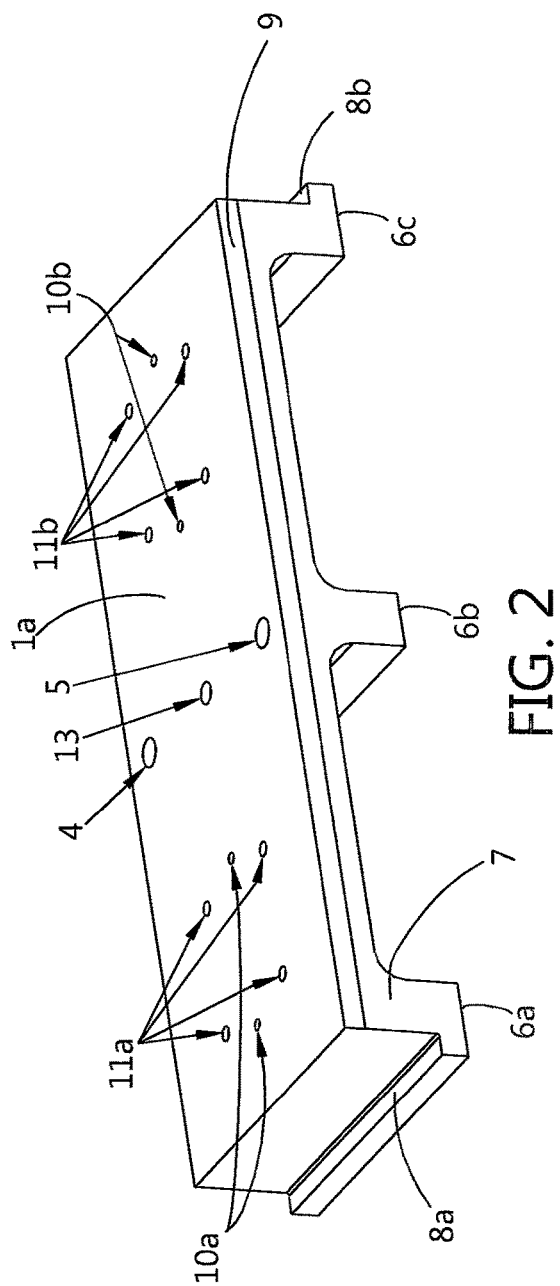
FIG. 2 is a perspective view of the body.

FIG. 2 shows an isometric view of the fixture body. A top surface 1a of the body contains the apertures 10a, 10b, 11a, and 11b used for mounting test block heads by the operator, or user, accessing them from below the top surface. The front 7 of the body is shown with a witnessed face 9. The body has a length parallel to the front 7 and a width perpendicular to the front, generally less than the length. Preferably the length is at least twice the width of the body. The top surface 1a of the body has an orientation mutually parallel to and spaced apart from a bottom plane defined through bottom surfaces 6a, 6b, and 6c of the body. The top surface has a spacing to the bottom surface causing a flatness of the top surface within 0.0005 in, five ten-thousandths of an inch at any two measuring positions. Upwardly from two outermost surfaces 6a, 6c as shown, the body 1 has two feet 8a, 8b. Any deviation of flatness outside this tolerance may cause the fixture body to curve, or to deflect, upon fastening the feet 8a and 8b to a machine table and thus resulting in inaccurate results regarding a machine, machine tool, or tool head.

The top surface 1a has many apertures used for positioning and fastening the test heads. The tooling hole aperture 13 supports a light press fit with tooling and has a position in the center of the top surface 1a. The aperture 13 has a tolerance of +0.000/−0.0005 in, plus zero/minus five ten-thousandths of an inch. Apertures 10a and 10b receive dowel pins, not shown, and have a position within 0.001 inch, one-thousandth of an inch. The apertures, 10a and 10b, support a press fit of the dowel pins, not shown, and must be to a tolerance of +0.000/−0.001 inch, plus zero/minus one-thousandths of an inch. The apertures in a group, as shown at 11a and 11b, each have threaded holes for fastening of the test heads, preferably right hand threading. Each apertures group, such as the pluralities shown at 11a and 11b, has the same pattern, with a minimum of three holes and typically four holes as shown. The pattern of apertures have a nominal distance from the tooling hole aperture 13. Preferably, the body 1 has two pluralities of apertures shown as groups 11a and 11b the receive the left test head 2 and the right test head 3 respectively. Threaded apertures 4 and 5 are positioned in the center of the fixture body.

The front face 7 of the fixture body 1, referred to as the CNC front, has a witness cut 9 along the top edge that travels the length of the body. This surface provides repeatable straightness orientation for setup and installation of the invention. The witness cut 9 should be straight within 0.0002 inch, two-ten thousandths of an inch, to process repeatable setups.

Figure 3:
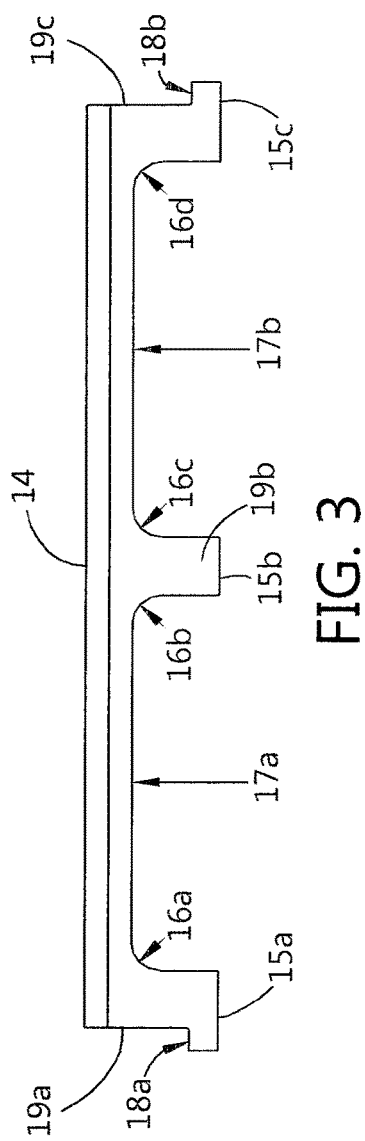
FIG. 3 is a front view of the body.

FIG. 3 is the front view of the fixture body. The bottom of the body shown as 15a, 15b, and 15c has large slots 17a and 17b that extend through the entire width of the fixture. Slot 17a extends between bottom portions 15a, 15b, and slot 17b extends between bottom portions 15b, 15c towards the right in this figures. In the industry this view is referred to as the "CNC front," with the witness 9 forward to the user, often a machinist or operator. The top surface 1a serves as the uppermost portion of the body 1. The top surface though is a component of a top 14 having a width, a length, and a thickness. The top 14 has three legs 19a,19b and 19c depending there from. The three legs include two outer legs 19a, 19c and a center leg 19b. The two outer legs are mutually spaced apart and generally symmetric about the center leg. The two outer legs define the height of the body. The height of the body causes a user to raise a toolhead for ready comfortable measuring. Each leg extends downwardly from the top, that is, beneath the top surface, and terminates in a corresponding bottom surface 15a, 15b, 15c, respectively. The three legs are generally perpendicular to and opposite the top surface 1a. The outer legs are generally mutually parallel to the center leg. The bottom surfaces 15a, 15b, 15c, cooperatively form the bottom plane previously denoted as 6a, 6b, 6c. The left most leg, 19a, or outer leg, has an inner radius as at 16a. The center leg, 19b, has two spaced apart radii, 16a, 16b. And the right most leg, 19c, or outer leg, has its inner radius as at 16d generally opposite that of the radius 16a of the left most leg. These radii occur at the merging of the legs with the top 14 of the body 1. This thickened material strengthens and stiffens the knee merge of the legs, 19a, 19b, 19c, to the top just below the top surface 1a. More particularly, the left most leg 19a and the right most leg 19c, have feet 18a, 18b respectively that extend 90 degrees, or perpendicular, to the height of each leg, that is, oppositely outward. The feet, 18a, 18b allow for clamping the fixture on a machine table top. The feet 18a and 18b extend parallel to the width of the body, that is laterally, and provide various clamping locations in a machine tool or CMM. The feet extend beyond the top surface.

The fixture body 1 has a one piece design for a solid fixture used in repeatable setups. To form the three legs 19a, 19b, and 19c, two large swaths of material are removed by machine from the bottom of the fixture body 1 leaving the slots 17a, 17b between the bottom surfaces 15a, 15b, 15c. These slots 17a and 17b form radii 16a,16b,16c, and 16d remaining beneath the top 14 and they add support between the top 14 and the legs 19a, 19b, and 19c. The radii 16a,16b,16c, and 16d add strength and stiffness to the fixture body for repeatable clamping results allowing the top 14 to remain mutually parallel to the bottom surfaces 15a, 15b, and 15c of the legs for the design life of the body 1.

Figure 4A:
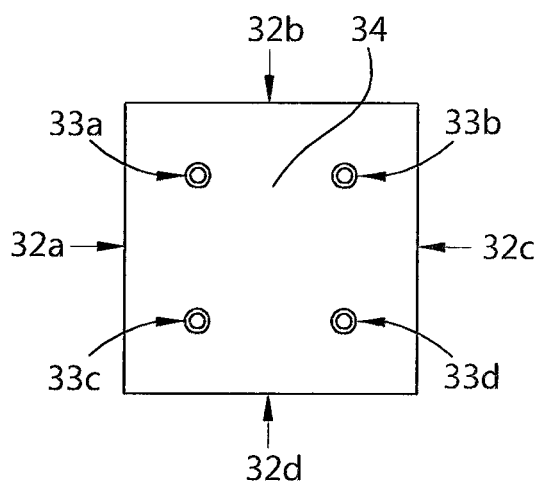
FIG. 4A is the top view of the left test head.
Figure 4B:
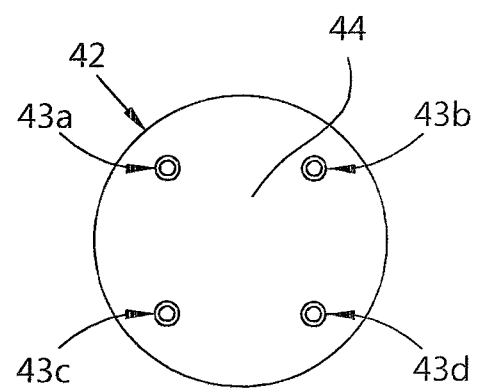
FIG. 4B is the top view of the right test head.
Figure 5A:
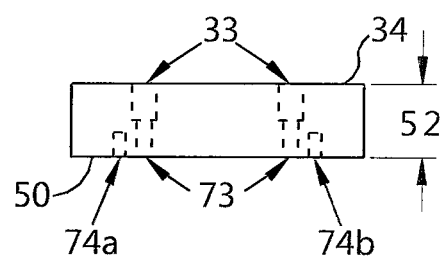
FIG. 5A is the front view of the left test head.
Figure 5B:
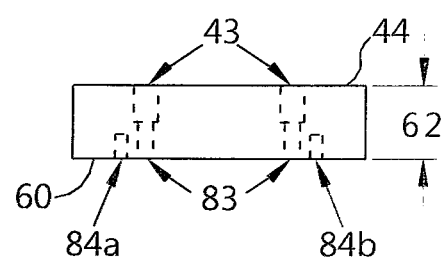
FIG. 5B is the front view of the right test head.
Figure 6A:
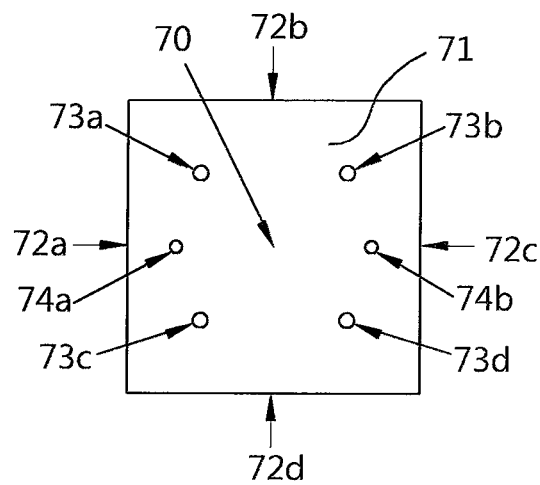
FIG. 6A is the bottom view of the left test head.
Figure 6B:
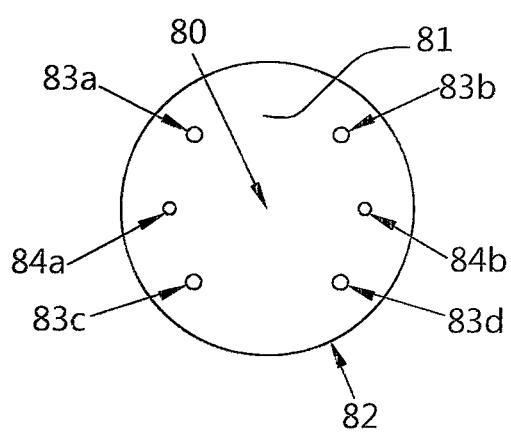
FIG. 6B is the bottom view of the right test head.

In the following description and in reference to the drawings, FIG. 4A, FIG. 5A, and FIG. 6A show the square test head or left head 2. Then FIG. 4B, FIG. 5B, and FIG. 6B show the round test head or right head 3.

FIG. 4A shows the left test head 2 for providing milling results from a CNC machine tool. A top 34 of the head is a planar surface. The top 34 of the left test head has four apertures as at 33a, 33b, 33c, and 33d. The test head has a square shape with four sides as at 32a, 32b, 32c, 32d, with two sides parallel to the feet 18a, 18b. The sides each have the same length and also define a width of the test head. Two of the sides are mutually parallel and spaced apart while the other two of the sides are mutually parallel and spaced apart but perpendicular to the first pair of sides. The sides, 32a, 32b, 32c, 32d, allow for milling tests to inspect a machine tool's accuracy of squareness, parallelism, and positioning. A common problem for machine tools occurs when one axis wears or fails resulting in machining different sizes from one axis to another. Sides 32a and 32c would commonly show results for the machine tool's "X axis" and sides 32b and 32d would commonly show results for the machine tool's "Y axis". After running an endmill around this test head in a mill test, a machine operator verifies the machine's squareness and parallelism with his micrometer. Furthermore, after a mill test, the sides 32a, 32b, 32c, 32d, are measured with the CMM to inspect squareness, parallelism, and positioning. Each pair of spaced apart sides has a spacing measured at two positions with a tolerance of 0.001 inch at a temperature of 68° F.

FIG. 4B shows a right test head 3 used for providing milling results from a machine tool. The top 44 of the head is a planar surface, round in shape with a circumference defining a perimeter. The top 44 of the right test head has four apertures 43a, 43b, 43c, 43d equiangularly spaced upon a common radius. Depending from the top 44 the along the circumference, the right test head 3 has a side 42, its round shape, with a diameter, concentric to the center. This surface 42, or side, permits milling tests to inspect a machine tool's accuracy of circularity and positioning. A common problem for machine tools occurs when one axis wears or fails resulting in mismatched machining marks on the surface 42 at 3 o'clock, 6 o'clock, 9 o'clock and 12 o'clock positions. After running an endmill around this right test head, a machine operator may run a position command via machine control to the center of the test head and verify the concentricity of the machine diameter with a test indicator. Furthermore, after a mill test on the surface 42, the machine tool test fixture is measured with the CMM to inspect circularity and positioning. In an alternate embodiment, the width of the left test head is proportional in size to the diameter of the right test head. In a further alternate embodiment the diameter of the right test head is the same as the width of the left test head. The sides allows for measurement at least at two positions of at least 44 degrees of angular rotation between the at least positions at a tolerance of 0.001 inch at a temperature of 68° F.

FIG. 5A is a front view of the left test head 2. This view shows a pair of apertures 74a and 74b, or outer apertures, extending partially into a bottom 50 of the test head. These apertures 74a and 74b have a shallow depth as shown. The bottom 50 of the left test head is flat and mates and then fastens to the top 14 of the fixture body 1. The bottom 50 sits flush upon the top surface of the fixture body 14. Inwardly from the apertures 74a and 74b, the bottom has additional apertures 73 that communicate through to apertures 33 as shown. These stepped apertures 73, 33, or inner apertures, allow an operator to fasten the head to the fixture body using mechanical fasteners. The inner apertures may have a step in their diameter as shown between aperture portion as at 33 and as at 73. The outer apertures 74a and 74b position the test head on the fixture body. The apertures 74a and 74b are blind holes whose depths do not exceed one-third of the test head's height as at 52. The depths of apertures 74a, 74b and 33 allow milling tests over the entire top 34 thus avoiding machining contact with fasteners and locating pins.

FIG. 5B is a front view of the right test head 3. This view similarly shows a pair of apertures 84a and 84b, or outer apertures, extending partially into, that is upward in the figure, a bottom 60 of the test head 3. The bottom 60 of the right test head is flat and mates and then fastens to the top 14 of the fixture body 1. The bottom 60 sits flush upon the top surface of the fixture body 14. Upon installation on the top surface, the bottom 60 of the right test head is coplanar with the bottom 60 of the left test head. Inwardly from the apertures 84a and 84b, stepped apertures 83 and 43 extend through the bottom and permit fastening the head to the fixture body. The inner apertures may have a step in their diameter as shown between aperture portion as at 83 and as at 43. The outer apertures 84a and 84b position the test head on the fixture body. Apertures 84a and 84b are blind holes which depths do not exceed more than one-third of the distance of the test head height as at 62. The depths of apertures 84a, 84b and 43 allow milling tests over the entire top surface 44 and avoid machining contact with fasteners and locating pins.

FIG. 6A is a bottom view of the left test head 2 showing its bottom surface 71. This view shows the centerline 70 of the test head with apertures, 73a, 73b, 73c, and 73d, arranged in the pattern as shown, and used for fastening to the fixture body. Apertures 73a, 73b, 73c, and 73d, or inner apertures, are shown in a pattern from the center 70 of the test head. The sized apertures 74a and 74b are parallel with the center 70 of the test head. The outer apertures 74a and 74b position the test head 2 on the fixture body and have a size within 0.001 inch, one thousandth of an inch, of a locating pin. This pattern of apertures 73a, 73b, 73c, 73d, 74a, and 74b matches the same pattern shown on the top of the fixture body 1 in FIG. 4a, thus the apertures of the left test head are in registration with the apertures of the body. The test head's four sides 72a, 72b, 72c, 72d are evenly spaced from the center 70 of the test head and with two sides parallel to the feet of the body.

FIG. 6B is a bottom view of the right test head showing the bottom surface 81. This view shows the centerline 80 of the test head with a pattern of apertures 83a, 83b, 83c, and 83d used for fastening to the fixture body. The apertures 83a, 83b, 83c, and 83d, or inner apertures, are shown in a pattern from the center 80 of the test head. The outer apertures 84a and 84b are parallel with the center 80 of the test head. The outer apertures 84a and 84b attach the test head to the fixture body and have a size within 0.001 inch, one thousandth of an inch, of the locating pin, not shown. This pattern of apertures 83a, 83b, 83c, 83d, 84a, and 84b matches the same pattern shown on the top of the fixture body 1 in FIG. 4b, thus the apertures of the right test head are in registration with the apertures of the body. The test head has a diameter as at 82, concentric to the center 80 of the test head. Though FIGS. 1-6B show patterns of four inner apertures, the Applicant foresees a minimum of at least three inner apertures as sufficient to secure a test head to the body.

The preceding figures show the invention and its various components. Because the invention is in the metrology field, the invention and its components have their own inherent accuracy. More particularly, the length and the width of the body, the width of the left test head, the diameter of the right test head, the positions of the first group of apertures, the positions of the second group of apertures, and any diameter meet a tolerance of no more than one thousandth of an inch and the measurements are taken at a temperature of sixty eight degrees Fahrenheit.

Figure 7:
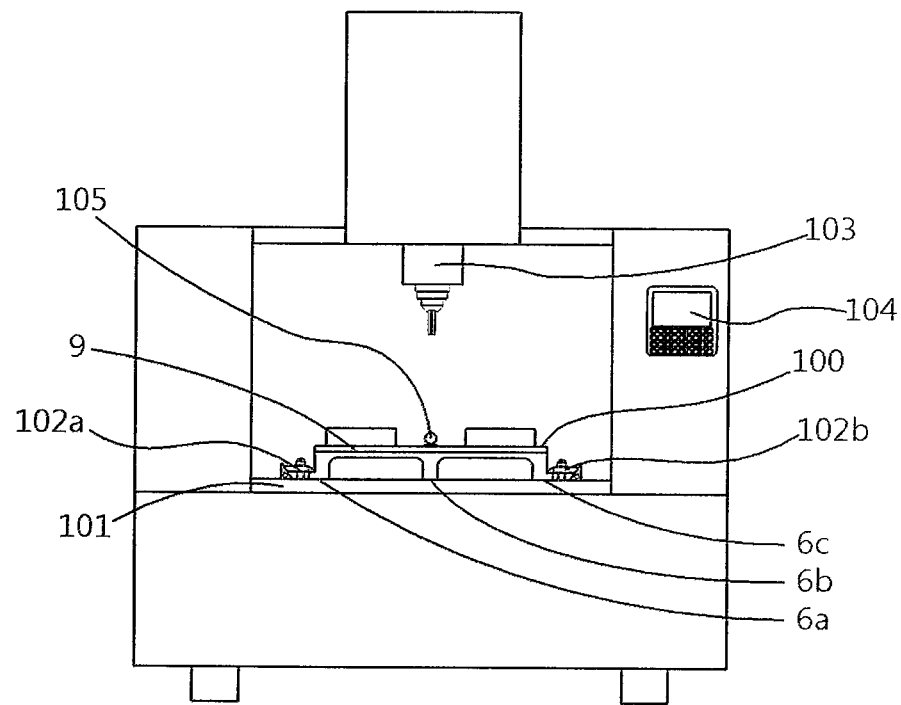
FIG. 7 is a front view of the test fixture installed in a CNC machine tool.

FIG. 7 is a front view of the machine tool test fixture 100 installed in a CNC machine tool. The test fixture assembly 100 is clamped down with fasteners 102a and 102b on the CNC machine tool table 101. Machine tools have many features. The machine tool has a table 101, a spindle 103, and a controller 104. The spindle receives a toolhead, a tool, a bit, a tip, or the like for machining, shaping, or otherwise manipulating a blank of material. The fixture body's bottom surface, as at 6a, 6b, 6c, is shown flat to the table 101. Fastening clamps 102a and 102b deploy on the outside feet 18a, 18b to secure the fixture to the machine table 101. The front witness cut 9 is shown to the front of the machine used to set the orientation of the fixture. One datum is shown with a construction ball 105 located in the center of the fixture body tooling hole 13. Using the controller 104, an operator positions the centerline of the spindle 103 to the centerline of the construction ball 105 to set digitally the origin of the work piece.

Figure 8:
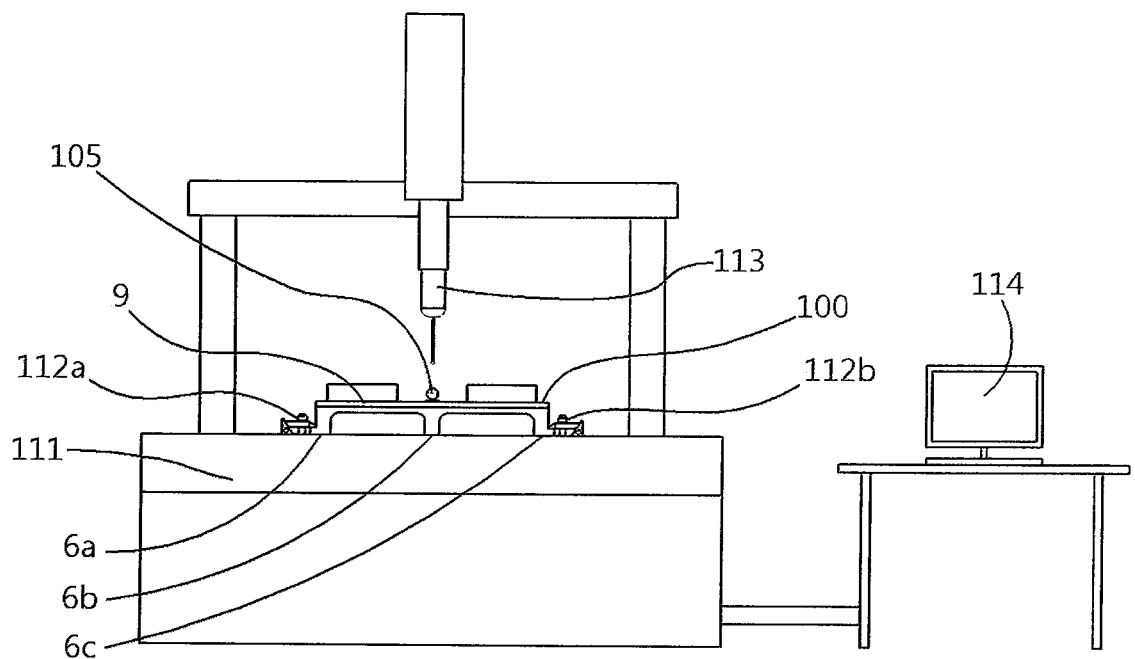
FIG. 8 is a front view of the test fixture installed in a CMM.

FIG. 8 is a front view of the machine tool test fixture 100 then installed in a CMM. The test fixture assembly 100 is clamped down with fasteners 112a and 112b on the CMM's granite table 111, one of the many features of a CMM. The measuring starts with a table 111, a probe 113, and a computer 114. The fixture body's bottom surfaces 6a, 6b, 6c are shown mutually parallel or flat to the table 111. Fastening clamps 112a and 112b deploy on the outside feet to secure the fixture to the machine table 111. The front witness cut 9 is shown to the front of the measuring machine used to set the orientation of the fixture. One datum appears with the construction ball 105 located in the center of the fixture body tooling hole 13. The probe 113 uses the construction ball 105 to set digitally the origin of the work piece. Measurements from inspected areas are read and recorded with a computer 114.

Figures 9, 10:
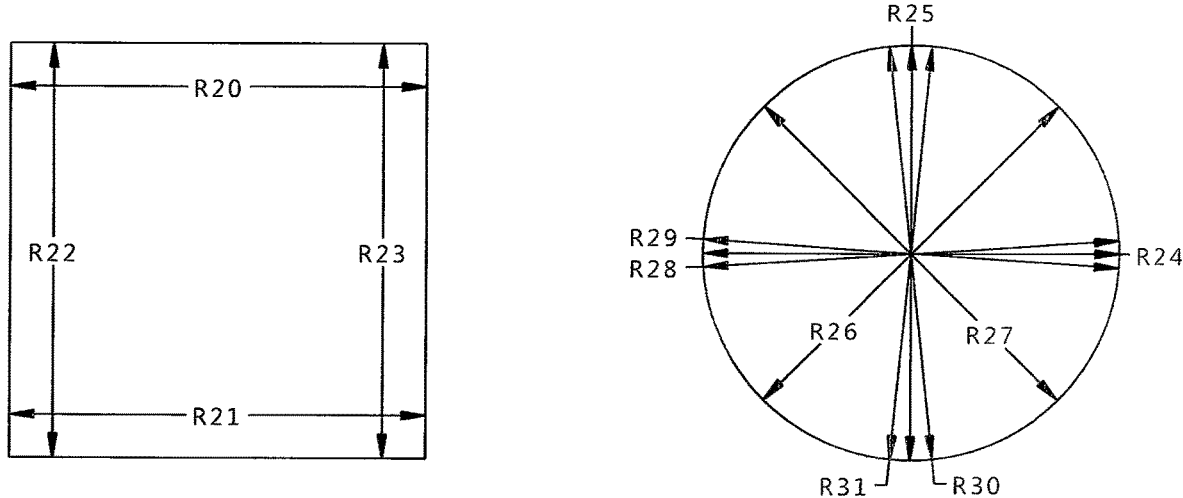
FIG. 9 is a top view of the test heads showing various measurements;
and,
FIG. 10 is a table showing test results from using the test fixture.

FIG. 9 is the top view of the square test head as at 2 on the left and of the round test head as at 3 on the right. The values of the dimensions shown in R20 and R21 are used to represent parallelism of a machine tool. The values of the dimensions shown in R22 and R23 are also used to represent parallelism of a machine tool. Cross referencing values R20 and R21 against values R22 and R23 determines the squareness of a machine tool.

On the right test head 3, R25 and R26 values of the dimensions shown come from an orientation 90 degrees apart from each and relatively square to the front of the fixture. Values of the dimensions shown in R28, R29, R30, and R31 come from an orientation 90 degrees from each other and 45 degrees from the relative front of the fixture.

The R28, R29, R30, and R31 values are measured 1 degree of rotation off from values R24 and R25. These key values represent a machine tool's axis moving a positive value to a negative value and moving a negative value to a positive value. The amount of backlash within a machine tool's axis can significantly affect these values.

The values of the dimensions shown in R24, R25, R26, R27, R28, R29, R30, and R31 all represent the circularity of a machine tool. Out of tolerance machine tools may correctly qualify R24 and R25 values while failing to quality R26, R27, R28, R29, R30, and R31 values.

Machine tool axes can be compensated individually for out of tolerance positioning. But, compensating a machine tool's axis for the best results on a round geometric shape can distort the results on a square geometric shape.

Likewise, compensating a machine tool's axis for the best results on a square geometric shape can distort the results on a round geometric shape. The combination of results from a square and a round geometric shape R20, R21, R22, R23, R24, R25, R26, R27, R28, R29, R30, and R31 provide the best values for compensating a machine tool's axis.

FIG. 10 displays a table with results from measurements taken from the dimensions shown in FIG. 9. The Target Dimension value is the size the machine tool is programmed to cut. The Target Dimension is the size the machine tool is trying to achieve. The Actual value is the measured size of the machine tool result. The Actual values for R20, R21, R22, and R23 in this example represent a machine tool squareness that is within 0.0003, three ten-thousandths of an inch. The Actual values R20, R21, R22, and R23 in this example represent the machine tool parallelism that is within 0.0000, an expected result. The Actual values R24, R25, R26, R27, R28, R29, R30, and R31 represent the machine tool circularity is within 0.0004, four ten-thousandths of an inch, an unexpected yet tolerable result. The machine tool axes can be compensated to achieve a better circularity result while maintaining a qualifying squareness result.

From the aforementioned description, a machine tool test fixture has been described. The machine tool test fixture is uniquely capable of simultaneously testing upon a square head and a round head. The machine tool test fixture and its various components may be may be manufactured from many materials, including but not limited to, steel, aluminum, polymers, ferrous and non-ferrous metal foils, their alloys, and composites.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A device for inspecting positioning, squareness, parallelism and circularity of a machine by a user, the machine having a toolhead, comprising:
 a body having a top surface, a center leg beneath said top surface and centered beneath said top surface, and two outer legs mutually spaced apart from said center leg, said center leg and said two outer legs being mutually parallel, said center leg and said two outer legs being perpendicular to and opposite to said top surface, said two outer legs defining a height of said body;
 a first plurality of apertures in said top surface;
 a second plurality of apertures in said top surface spaced away from said first plurality of apertures;
 a left test head, said left test head connecting to said first plurality of apertures, said left test head being square;
 a right test head, said right test head connecting to said second plurality of apertures, said right test head being round; and,
 said left test head and said right test head mounting upon said body thus providing for dual testing of the machine.

2. The device for inspecting positioning, squareness, parallelism and circularity of a machine of claim 1, further comprising:
   said left test head having a width and said right test head having a diameter.

3. The device for inspecting positioning, squareness, parallelism and circularity of a machine of claim 2 wherein the width of said left test head is the same as the diameter of said right test head.

4. The device for inspecting positioning, squareness, parallelism and circularity of a machine of claim 2 further comprising:
   said body having a length and a perpendicular width; and,
   said length and said width of said body, said width of said left test head, said diameter of said right test head, the positions of said first plurality of apertures, and the positions of said second plurality of apertures meeting a tolerance of no more than one thousandth of an inch.

5. The device for inspecting positioning, squareness, parallelism and circularity of a machine of claim 4 wherein the tolerance is measured at a temperature of sixty eight degrees Fahrenheit.

6. The device for inspecting positioning, squareness, parallelism and circularity of a machine of claim 1 further comprising:
   said left test head having a top surface and an opposite bottom surface, said bottom surface including two outer apertures partially extending into said left test head and at least three inner apertures positioned inwardly from said outer apertures, each of said inner apertures extending from said bottom surface to said top surface and through said left test head, and each of said inner apertures having a stepped diameter; and,
   said right test head having a top surface and an opposite bottom surface, said bottom surface including two outer apertures partially extending into said right test head and at least three inner apertures positioned inwardly from said outer apertures, each of said inner apertures extending from said bottom surface to said top surface and through said right test head, and each of said inner apertures having a stepped diameter.

7. The device for inspecting positioning, squareness, parallelism and circularity of a machine of claim 6 further comprising:
   said left test head having four sides, each of said sides having the same length;
   two of said sides being mutually parallel and spaced apart and the other two of said sides being mutually parallel and spaced apart and perpendicular to the first two of said sides; and,
   wherein each pair of spaced apart sides has a spacing capable of measurement thereof at least at two positions and the measurements meet a tolerance of no more than one thousandth of an inch at a temperature of sixty eight degrees Fahrenheit.

8. The device for inspecting positioning, squareness, parallelism and circularity of a machine of claim 6 further comprising:
   said right test head having one side defining a circumference and having a perimeter;
   wherein said side displays the diameter of said right test head capable of measurement thereof at least at two positions of angular rotation between the at least two positions and the measurements meet a tolerance of no more than one thousandth of an inch at a temperature of sixty eight degrees Fahrenheit.

9. The device for inspecting positioning, squareness, parallelism and circularity of a machine of claim 1 further comprising:
   each of said outer legs having a foot, each foot of each of said outer leg extending outwardly from said center leg and beyond said top surface.

10. A metrology device, operated by a user upon a machine tool, comprising:
   a left test head being square, having a top surface and an opposite bottom surface, said top surface having at least three inner apertures, each of said inner apertures extending from said top surface to said bottom surface and through said left test head, each of said inner apertures having a stepped diameter; said bottom surface having two outer apertures partially extending into said left test head and positioned outwardly from said inner apertures, and said top surface being mutually parallel to said bottom surface;
   a right test head being round, having a top surface and an opposite bottom surface, said top surface having at least three inner apertures, each of said inner apertures extending from said top surface to said bottom surface and through said left test head, each of said inner apertures having a stepped diameter; said bottom surface having two outer apertures partially extending into said left test head and positioned outwardly from said inner apertures, and said top surface being mutually parallel to said bottom surface;
   a body having a top surface, a center leg beneath said top surface and centered beneath said top surface, and two outer legs mutually spaced apart from said center leg, said center leg and said two outer legs being mutually parallel, said center leg and said two outer legs being perpendicular to and opposite to said top surface, said body receiving said left test head and said right test head upon its said top surface, each of said outer legs having a foot mutually extending opposite and outwardly from said center leg, each foot of each of said outer legs and said outer leg defining a common plane mutually parallel and spaced apart from said top surface, said two outer legs defining a height of said body;
   a first plurality of apertures in said top surface of said body;
   a second plurality of apertures in said top surface of said body spaced away from said first plurality of apertures;
   said bottom surface of said left test head adjoining said top surface of said body in registration with said first plurality of apertures, said left test head mechanically connecting to said first plurality of apertures;
   said bottom surface of said right test head adjoining said top surface of said body in registration with said second plurality of apertures, said right test head mechanically connecting to said first plurality of apertures; and,
   wherein said left test head mates upon said top surface of said body and said right test head mates upon said top surface of said body so that said top surface of said left test head and said top surface of said right test head are each parallel to said top surface of said body.

11. The metrology device of claim 10 further comprising:
   said left test head having a width and said right test head having a diameter wherein the width of said left test head is proportional to the diameter of said right test head.

12. The metrology device of claim 11 further comprising:
   said left test head having four sides, each of said sides having the same length;

two of said sides being mutually parallel and spaced apart and the other two of said sides being mutually parallel and spaced apart and perpendicular to the first two of said sides;

said left test head having an orientation upon said body wherein two of said sides are mutually parallel and spaced apart from a tangent to said right test head, and wherein said spaced apart of said left test head from said right test head is adapted to a user performing manual adjustment of the machine tool; and, wherein each pair of spaced apart sides has a spacing capable of measurement thereof at least at two positions and the measurements meet a tolerance of no more than one thousandth of an inch at a temperature of sixty eight degrees Fahrenheit.

13. The metrology device of claim 11 further comprising:
said right test head having one side defining a circumference and having a perimeter;
said right test head having an orientation upon said body wherein a tangent upon said side of said right test head is mutually parallel and spaced apart from two of said sides of said left test head, and wherein said spaced apart of said right test head from said left test head is adapted to a user performing manual adjustment of the machine tool; and,
wherein said side displays the diameter of said right test head capable of measurement thereof at least at two positions of angular rotation between the at least two positions and the measurements meet a tolerance of no more than one thousandth of an inch at a temperature of sixty eight degrees Fahrenheit.

14. The metrology device of claim 11 further comprising:
said left test head having four sides, each of said sides having the same length, each of said sides of said left test head being perpendicular to said top surface of said body;
said right test head having one side defining a circumference and having a perimeter, said side of said right test head being perpendicular to said top surface of said body; and,
wherein said sides of said left test are mutually parallel to said side of said right test head.

15. The metrology device of claim 10 further comprising:
said outer apertures of said left test head being in registration with apertures in said top surface of said body;
two mechanical fasteners extending through said top surface of said body and operatively engaging said outer apertures of said left test head thereby securing said left test head to said body;
said outer apertures of said right test head being in registration with apertures in said top surface of said body rightward of said left test head; and,
two mechanical fasteners extending through said top surface of said body and operatively engaging said outer apertures of said right head thereby securing said right test head to said body.

16. The metrology device of claim 10 further comprising:
said bottom surface of said left test head mating flush upon said top surface of said body; and,
said bottom surface of said right test head mating flush upon said top surface of said body.

17. The metrology device of claim 10 further comprising:
said body having at least one lifting aperture centered upon said center leg, said at least one lifting aperture being threaded.

18. The metrology device of claim 10 further comprising:
said left test head and said right test head mounting upon said body thus providing for dual testing of the machine tool.

19. A metrology device, operated by a user upon a machine having a toolhead for inspecting positioning, squareness, parallelism and circularity of the machine, comprising:
a body having a top surface, a center leg beneath said top surface and centered beneath said top surface, and two outer legs mutually spaced apart from said center leg, said center leg and said two outer legs being mutually parallel, said center leg and said two outer legs being perpendicular to and opposite to said top surface, said two outer legs defining a height of said body;
a first plurality of apertures in said top surface;
a second plurality of apertures in said top surface spaced away from said first plurality of apertures;
each of said outer legs having a foot, each foot of each of said outer leg extending outwardly from said center leg and beyond said top surface;
a left test head, said left test head connecting to said first plurality of apertures, said left test head being square;
a right test head, said right test head connecting to said second plurality of apertures, said right test head being round;
said left test head having a width and said right test head having a diameter;
said left test head having a top surface and an opposite bottom surface, said bottom surface including two outer apertures partially extending into said left test head and at least three inner apertures positioned inwardly from said outer apertures, each of said inner apertures extending from said bottom surface to said top surface and through said left test head, and each of said inner apertures having a stepped diameter;
said left test head having four sides, each of said sides having the same length, two of said sides being mutually parallel and spaced apart and the other two of said sides being mutually parallel and spaced apart and perpendicular to the first two of said sides, wherein each pair of spaced apart sides has a spacing capable of measurement thereof at least at two positions and the measurements meet a tolerance of no more than one thousandth of an inch at a temperature of sixty eight degrees Fahrenheit;
said right test head having a top surface and an opposite bottom surface, said bottom surface including two outer apertures partially extending into said right test head and at least three inner apertures positioned inwardly from said outer apertures, each of said inner apertures extending from said bottom surface to said top surface and through said right test head, and each of said inner apertures having a stepped diameter; and,
said right test head having one side defining a circumference and having a perimeter, wherein said side displays the diameter of said right test head capable of measurement thereof at least at two positions of angular rotation between the at least two positions and the measurements meet a tolerance of no more than one thousandth of an inch at a temperature of sixty eight degrees Fahrenheit.

\* \* \* \* \*